CHARLES MANSON.
Improvement in Bit-Stocks.

No. 114,314.  Patented May 2, 1871.

Witnesses.
Frank G. Parker
Geo. R. Clarke

Inventor:
Charles Manson

United States Patent Office.

CHARLES MANSON, OF BOSTON, MASSACHUSETTS.

Letters Patent No. 114,314, dated May 2, 1871.

IMPROVEMENT IN BIT-STOCKS.

The Schedule referred to in these Letters Patent and making part of the same.

*To all whom it may concern:*

I, CHARLES MANSON, of Boston, county of Suffolk and State of Massachusetts, have invented certain new and useful Improvements in Ratchets for Bit-Stocks and Screw-Drivers, of which the following is a specification.

The Nature of the Invention.

The nature of my invention consists in connecting with a crown ratchet-wheel, pawls with shifting devices, so arranged in connection with a bit-stock that the socket may revolve with the handle when the handle revolves one way, and be stationary while the handle moves in the opposite direction; one of the pawls, while in action, serving to drive the socket in one direction and the other to drive it in the opposite direction.

Description of the Accompanying Drawing.

Figure 1:
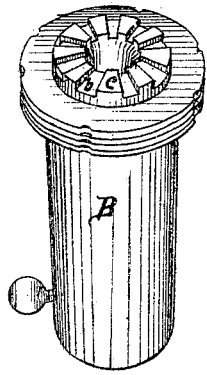
Figure 1 shows, in perspective, the bit-socket, with the crown-ratchet $b\ c$ on its end.
Figure 4:
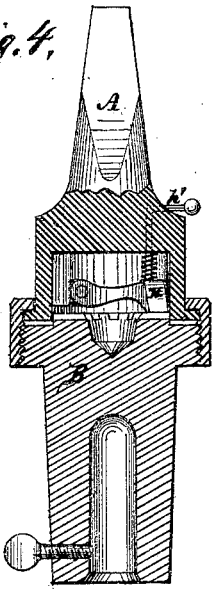
Figure 4 is a section through the whole.

I construct my invention as follows:

A, figs. 1 and 4, represents that part of the screw-driver or bit-stock which holds the blade or bit.

$c\ b$ is a crown-ratchet, the dentals of which have vertical sides, so that the ratchet-points may work upon either side of them.

Figure 2:
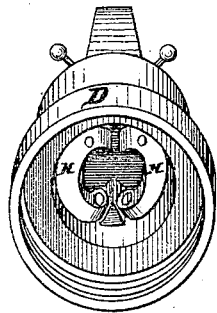
Figure 2 shows, in perspective, that part which is connected directly with the handle; also, the two pawls H and H'.

B B', figs. 2 and 4, represent the part which serves to connect with the handle of the screw-driver or bit-stock.

D is a coupling-ring, made with an internal thread, as shown, so that it may hold the parts A and B together, as represented in fig. 4.

Figure 3:
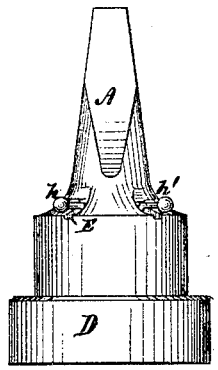
Figure 3 shows, in elevation, the upper part of the socket-piece A, with the pawls H H' and the wires $h$ $h'$ for holding the same.

H and H', figs. 2 and 3, are pawls, pivoted to the part B, and so arranged, as shown in fig. 3, that one or both may be raised up and be out of contact with the teeth of the ratchet $b\ c$. If both are raised then the bit-socket A will not revolve with the handle. If one be down the bit-socket will revolve, while the handle revolves in one direction only. If both be down the bit-socket will revolve either way with the handle.

$h$ and $h'$ are small bent wires attached to the pawls H and H'.

The bent or upper end of these wires $h$ and $h'$ traverse in a slot, E, fig. 4, so that when drawn up and turned, as indicated by $f'$ fig. 4, they will stay up, and thus hold the pawls in place and thus keep them from acting upon the ratchet.

I claim as my invention—

The arrangement of the ratchet $b\ c$ with the pawls H and H', and the adjusting-rods $h$ and $h'$, when constructed as shown and described, and for the purpose set forth.

CHARLES MANSON.

Witnesses:
FRANK J. PARKER,
JAS. L. CONANT.